(12) United States Patent  (10) Patent No.: US 9,135,194 B2
Freimuth et al.  (45) Date of Patent: *Sep. 15, 2015

(54) ALL-TO-ALL COMPARISONS ON ARCHITECTURES HAVING LIMITED STORAGE SPACE

(71) Applicant: International Business Machines Corporation, Armonk, NY (US)

(72) Inventors: Douglas M. Freimuth, New York, NY (US); Vipin Sachdeva, Indianapolis, IN (US)

(73) Assignee: International Business Machines Corporation, Armonk, NY (US)

( * ) Notice: Subject to any disclaimer, the term of this patent is extended or adjusted under 35 U.S.C. 154(b) by 6 days.

This patent is subject to a terminal disclaimer.

(21) Appl. No.: 14/061,389

(22) Filed: Oct. 23, 2013

(65) Prior Publication Data

US 2014/0052886 A1 Feb. 20, 2014

Related U.S. Application Data

(63) Continuation of application No. 12/329,989, filed on Dec. 8, 2008, now abandoned.

(51) Int. Cl.
*G06F 15/00* (2006.01)
*G06F 15/76* (2006.01)
*G06F 13/28* (2006.01)
*G06F 11/34* (2006.01)
*G06F 9/38* (2006.01)
*G06F 17/10* (2006.01)

(52) U.S. Cl.
CPC .............. *G06F 13/28* (2013.01); *G06F 9/3885* (2013.01); *G06F 11/3404* (2013.01); *G06F 17/10* (2013.01)

(58) Field of Classification Search
None
See application file for complete search history.

(56) References Cited

U.S. PATENT DOCUMENTS

| 5,748,959 | A | 5/1998 | Reynolds |
| 2002/0002640 | A1* | 1/2002 | Barry et al. ..................... 710/22 |
| 2006/0044316 | A1* | 3/2006 | Haghighi ..................... 345/544 |
| 2007/0179746 | A1 | 8/2007 | Jiang et al. |
| 2007/0283093 | A1 | 12/2007 | Zohar et al. |
| 2008/0077930 | A1* | 3/2008 | Eichenberger et al. ........ 718/105 |
| 2008/0140592 | A1 | 6/2008 | Ben-Hur et al. |
| 2008/0168259 | A1 | 7/2008 | Biran et al. |

(Continued)

OTHER PUBLICATIONS

U.S. Appl. No. 12/329,989.

(Continued)

*Primary Examiner* — George Giroux
(74) *Attorney, Agent, or Firm* — Stephen J. Walder, Jr.; Thomas E. Tyson

(57) ABSTRACT

Mechanisms for performing all-to-all comparisons on architectures having limited storage space are provided. The mechanisms determine a number of data elements to be included in each set of data elements to be sent to each processing element of a data processing system, and perform a comparison operation on at least one set of data elements. The comparison operation comprises sending a first request to main memory for transfer of a first set of data elements into a local memory associated with the processing element and sending a second request to main memory for transfer of a second set of data elements into the local memory. A pairwise comparison computation of the all-to-all comparison of data elements operation is performed at approximately a same time as the second set of data elements is being transferred from main memory to the local memory.

39 Claims, 6 Drawing Sheets

(56) References Cited

U.S. PATENT DOCUMENTS

| | | |
|---|---|---|
| 2008/0183779 A1 | 7/2008 | Jia |
| 2008/0189071 A1 | 8/2008 | Aguilar et al. |
| 2010/0146518 A1 | 6/2010 | Freimuth et al. |
| 2012/0185870 A1 | 7/2012 | Freimuth et al. |

OTHER PUBLICATIONS

U.S. Appl. No. 13/429,915.

Kandemir, M. et al., "Dynamic Management of Scratch-Pad Memory Space", ACM, Jun. 2001, pp. 690-695.

Liben-Nowell, David et al., "The Link Prediction Problem for Social Networks", Proceedings of the Twelfth International Conference on Active Media Technology, 2003, 19 pages.

Mild, Andreas et al., "Collaborative Filtering Methods for Binary Market Basket Data Analysis", Proceedings of the Sixth International Computer Science Conference on Active Media Technology, 2001, pp. 302-313.

Murata, Tsuyoshi, "machine Discovery Based on the Co-occurrence of References in a Search Engine", Proceedings of the Second International Conference of Discovery Science, 1999, pp. 220-229.

Nemmour, Hassiba et al., "New Jaccard-Distance Based Support Vector Machine Kernel for Handwritten Digit Recognition", 3rd International Conference on Information and Communication Technologies: From Theory to Applications, (ICTTA), 2008, pp. 1-4.

Perera, Darshika G. et al., "Parallel Computation of Similarity Measures Using an FPGA-Based Processor Array", 22nd International Conference on Advance Information Networking and Applications, 2008, pp. 955-962.

Petrini, Fabrizio et al., "Multicore Surprises: Lessons Learned from Optimizing Sweep3D on the Cell Broadband Engine", IEEE, Mar. 2007, pp. 1-10.

Sudkamp, Thomas et al., "Toward Fuzzy-Valued Matching and Similarity Assessment", IEEE, 1996, pp. 59-62.

Willett, P., "Similarity-based virtual screening using 2D fingerprints", Drug Discovery Today, 2006, 11 (23-24), 19 pages.

* cited by examiner

Data: n vectors $S_0, S_1 \ldots\ldots S_{n-1}$ each of length b

Result: The J (i,j) obtained by computing the $S_i$ vector with the $S_j$ vector i<n , j<n
begin k=0
(1)    for (i=0; i<n; i=i+1) do
(2) for (j= i+1; j<n; j=j+1) do
   (2.1) J(k) = J( $S_i$, $S_j$ )
   k = k+1 end

ALL-TO-ALL COMPARISONS ON ARCHITECTURES HAVING LIMITED STORAGE SPACE

This application is a continuation of application Ser. No. 12/329,989, filed Dec. 8, 2008, status allowed.

BACKGROUND

The present application relates generally to an improved data processing apparatus and method and more specifically to an apparatus and method for performing all-to-all comparisons on data processing system architectures having explicit memory accesses and limited storage space.

An All-to-All comparison operation is defined as an operation in which every pair of data elements are compared for an output result. For example, given 3 data elements S1, S2, and S3, an All-to-All comparison operation comprises executing one or more comparison algorithms for performing a comparison between data elements S1 and S2, a comparison between data elements S1 and S3, and finally a comparison between data elements S2 and S3, such that every pair of data elements is compared. As a general rule, given n data elements, $n*(n-1)/2$ comparisons need to be performed using All-to-All comparison operation.

The data elements subject to such an All-to-All comparison operation may be defined as data sequences, data values (e.g., numbers), or any other data format. Such All-to-All comparison operations are commonly used in many different types of workloads including bioinformatics, image processing, etc. The algorithm used to perform such All-to-All comparison operations varies depending upon the particular workload. For example, in bioinformatics, the comparisons are global or local alignments in which Deoxyribonucleic Acid (DNA) or protein sequences are compared to output an integer result which denotes how closely the sequences are related to each other.

One algorithm used to perform All-to-All comparisons is the Jaccard algorithm which generates the Jaccard coefficient. The Jaccard coefficient, or Jaccard index as it is also called, is a correlation coefficient for determining the similarity between two binary strings, or bit vectors. Mathematically, given two equal length bit vectors x and y, with entries indexed from 0 to n, the Jaccard index computes:

Jaccard Coefficient (Index)=$c/(a+b+c)$ where c is the AND product and (a+b) is the XOR product of 2 vectors x and y. The Jaccard coefficient is used to compute the similarity of objects that are described by feature vectors, where each entry in the bit vector corresponds to the presence or absence of a particular feature. The Jaccard coefficient finds its applications in a wide variety of areas including drug design, similarity searching on the Internet, financial applications, and social network analysis.

SUMMARY

In one illustrative embodiment, a method, in a data processing system having a plurality of processing elements, for performing a portion of an All-to-All comparison of data elements operation is provided. The method comprises determining a number of data elements to be included in each set of data elements to be sent to each processing element of the plurality of processing elements. The method further comprises performing a comparison operation, of a portion of the All-to-All comparison of data elements operation assigned to a processing element, on at least one set of data elements and storing results of the comparison operation in main memory of the data processing system. The comparison operation comprises sending, from the processing element, a first request to main memory for transfer of a first set of data elements into a local memory associated with the processing element. The comparison operation further comprises sending, from the processing element, a second request to main memory for transfer of a second set of data elements into the local memory. Moreover, the comparison operation comprises performing a pair wise comparison computation of the portion of the All-to-All comparison of data elements operation, at approximately a same time as the second set of data elements is being transferred from main memory to the local memory.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figures 1, 3:
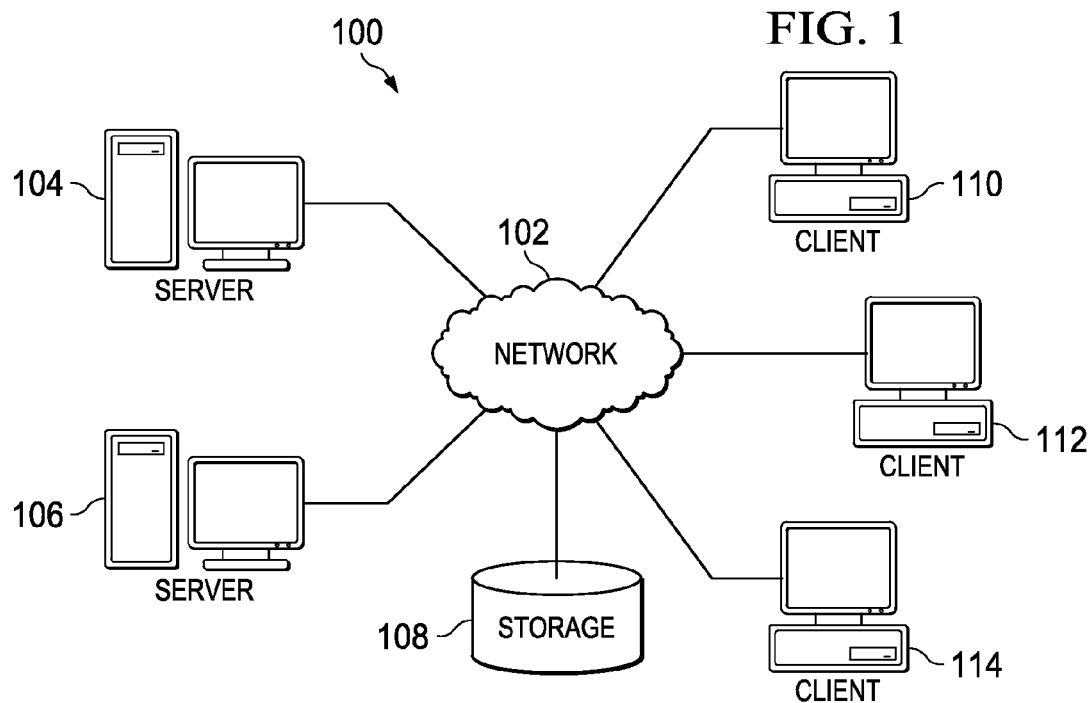
FIG. 1 is an example diagram of a data processing system in which example aspects of the illustrative embodiments may be implemented.
FIG. 3 is an example diagram of a kernel algorithm for performing a Jaccard All-to-All comparison operation.
Figure 2:
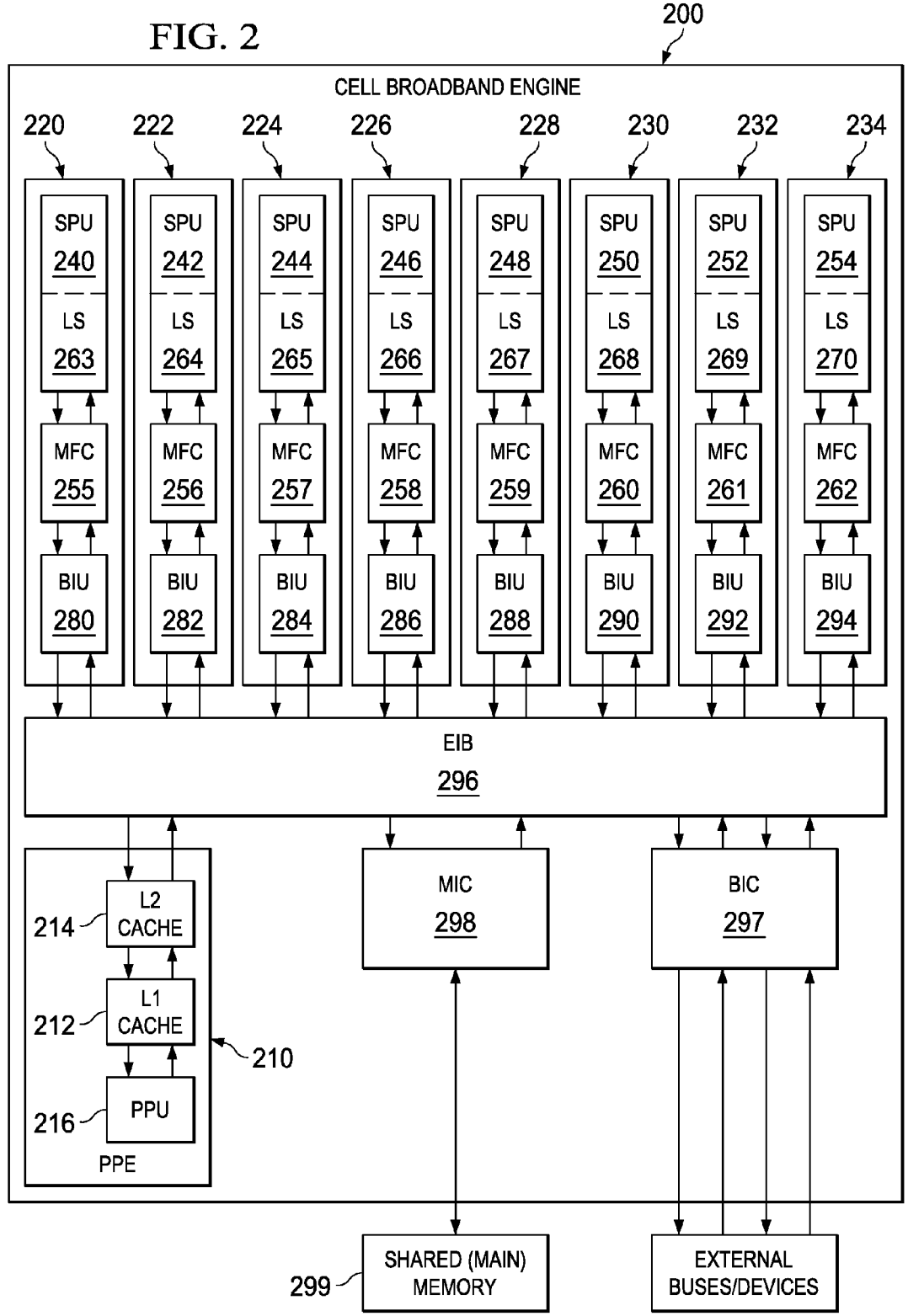
FIG. 2 is an example diagram of a Cell Broadband Engine architecture in which example aspects of the illustrative embodiments may be implemented.

The illustrative embodiments provide a mechanism for performing All-to-All comparisons, such as All-to-All comparisons using the Jaccard coefficient, in such a way as to minimize Direct Memory Access (DMA) transfers while reusing data in local stores with overlapping of computation and communication within the data processing system architecture. The illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation using a Cell Broadband Engine architecture, this is only an example and is not intended to state or imply any limitation with regard to the features of the present invention. To the contrary, the illustrative embodiments are intended to include distributed data processing environments and embodiments in which the architecture in which the illustrative embodiment is implemented has explicit memory accesses with limited storage space.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

With reference now to the figures, and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

FIG. 1 is an example diagram of a distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located. In the depicted example, the data processing system 200 is an example of a Cell Broadband Engine architecture (CBE) 200, however it should be appreciated that this is only an example and the mechanisms of the illustrative embodiments may be implemented in other architectures as well, especially those in which there are explicit memory accesses with limited storage space.

As shown in FIG. 2, the CBE 200 includes a power processor element (PPE) 210 having a processor (PPU) 216 and its L1 and L2 caches 212 and 214, and multiple synergistic processor elements (SPEs) 220-234 that each has its own synergistic processor unit (SPU) 240-254, memory flow control 255-262, local memory or store (LS) 263-270, and bus interface unit (BIU unit) 280-294 which may be, for example, a combination direct memory access (DMA), memory management unit (MMU), and bus interface unit. A high bandwidth internal element interconnect bus (EIB) 296, a bus interface controller (BIC) 297, and a memory interface controller (MIC) 298 are also provided.

The local memory or local store (LS) 263-270 is a non-coherent addressable portion of a large memory map which, physically, may be provided as small memories coupled to the SPUs 240-254. The local stores 263-270 may be mapped to different address spaces. These address regions are continuous in a non-aliased configuration. A local store 263-270 is associated with its corresponding SPU 240-254 and SPE 220-234 by its address location, such as via the SPU Identification Register, described in greater detail hereafter. Any resource in the system has the ability to read/write from/to the local store 263-270 as long as the local store is not placed in a secure mode of operation, in which case only its associated SPU may access the local store 263-270 or a designated secured portion of the local store 263-270.

The CBE 200 may be a system-on-a-chip such that each of the elements depicted in FIG. 2 may be provided on a single microprocessor chip. Moreover, the CBE 200 is a heterogeneous processing environment in which each of the SPUs may receive different instructions from each of the other SPUs in the system. Moreover, the instruction set for the SPUs is different from that of the PPU, e.g., the PPU may execute Reduced Instruction Set Computer (RISC) based instructions while the SPU execute vectorized instructions.

The SPEs 220-234 are coupled to each other and to the L2 cache 214 via the EIB 296. In addition, the SPEs 220-234 are coupled to MIC 298 and BIC 297 via the EIB 296. The MIC 298 provides a communication interface to shared memory 299. The BIC 297 provides a communication interface between the CBE 200 and other external buses and devices.

The PPE 210 is a dual threaded PPE 210. The combination of this dual threaded PPE 210 and the eight SPEs 220-234 makes the CBE 200 capable of handling 10 simultaneous threads and over 228 outstanding memory requests. The PPE 210 acts as a controller for the other eight SPEs 220-234 which handle most of the computational workload. The PPE 210 may be used to run conventional operating systems while the SPEs 220-234 perform vectorized floating point code execution, for example.

The SPEs 220-234 comprise a synergistic processing unit (SPU) 240-254, memory flow control units 255-262, local memory or store 263-270, and an interface unit 280-294. The local memory or store 263-270, in one exemplary embodiment, comprises a 256 KB instruction and data memory which is visible to the PPE 210 and can be addressed directly by software.

The PPE 210 may load the SPEs 220-234 with small programs or threads, chaining the SPEs together to handle each step in a complex operation. For example, a set-top box incorporating the CBE 200 may load programs for reading a DVD, video and audio decoding, and display, and the data would be passed off from SPE to SPE until it finally ended up on the output display. At 4 GHz, each SPE 220-234 gives a theoretical 32 GFLOPS of performance with the PPE 210 having a similar level of performance.

The memory flow control units (MFCs) 255-262 serve as an interface for an SPU to the rest of the system and other elements. The MFCs 255-262 provide the primary mechanism for data transfer, protection, and synchronization between main storage and the local storages 263-270. There is logically an MFC for each SPU in a processor. Some implementations can share resources of a single MFC between multiple SPUs. In such a case, all the facilities and commands defined for the MFC must appear independent to software for each SPU. The effects of sharing an MFC are limited to implementation-dependent facilities and commands.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

As described above, the CBE 200 is an example of a heterogeneous, multi-core processor chip optimized for compute-intensive workloads and broadband, rich media applications. Within this heterogeneous architecture, the PPE 210 is responsible for running the operating system and coordinating the SPEs 220-234. The SPUs 240-254 of the SPEs 220-234 cannot access main memory directly but instead issues Direct Memory Access (DMA) commands to their MFCs 255-262 to bring data into their local memory or store 263-270 or write results of a computation back to main memory. Thus, the contents of the local memory or stores 263-270 are explicitly managed by software. The SPUs 240-254 can continue program execution while their corresponding MFCs 255-262 perform these DMA transactions.

Thus, for the CBE 200, the SPEs 220-234 need explicit messages, i.e. DMA requests/responses (collectively referred to as DMA transfers or transactions), to be sent back and forth between the PPE 210, main memory, and the SPE's local memory or store 263-270, before any computation on those data element can be performed. However, all the data elements and the consequent results of the comparison may not be able to be stored inside the SPU's local memory or store 263-270 due to storage space limitations. Similar limitations may apply to other architectures as well, such as distribute memory processing elements of cluster computing systems. Thus, such architectures need to send several messages back and forth, instead of a single message with all the data elements, since the space is not adequate for storing all the data elements and the results of the computations. Maximal reuse of the data is also critical since there is a cost associating with bringing data into the local memory, e.g., the SPE's local memory or store 263-270, based on the network or bus latency.

With these limitations of storage space in mind, the illustrative embodiments provide mechanisms for performing an All-to-All comparison operation on an architecture having explicit memory accesses and limited storage space. The mechanisms implement a substantially optimal parallel algorithm for performing the All-to-All comparison, which in one illustrative embodiment is a Jaccard All-to-All comparison resulting in Jaccard coefficients. The mechanisms of the illustrative embodiments minimize the DMA transfers present in the CBE 200, and other distributed memory processing architectures, and reuses data in the local stores 263-270 while overlapping computation with communication operations. With the mechanisms of the illustrative embodiments, the number of data elements distributed to each processing element, e.g., SPE 220-234, are determined through runtime tests which optimize load-balancing among the processing elements as well as the number of messages needed by every processing element to finish their computations. The term "messages" as it is used herein with specific reference to the CBE 200 means DMA requests/responses, although in other architectures such messages may be Message Passing Interface (MPI) messages, socket-to-socket communications, or the like. This approach provided by the illustrative embodiments has been shown to provide super linear speedup as the number of SPEs or processing elements are increased, i.e. the decrease in time to complete the All-to-All comparison operation is much faster than the increase in the number of processing elements.

FIG. 3 is an example diagram of a kernel algorithm for performing a Jaccard All-to-All comparison operation. In the example of FIG. 3, the kernel algorithm performs an overall computation in which every binary vector is compared with every other vector. The resulting Jaccard coefficients are stored in a single contiguous array, with the n−1 comparisons of the vector 0 being stored first, followed by the n−2 comparisons of the vector 1, and so on. Hereafter, the computation performed by the kernel algorithm shown in FIG. 3 will be referred to as the "Jaccard workload."

All-to-All comparisons, such as the Jaccard workload described in FIG. 3 and above, may be parallelized such that the comparisons can be performed in parallel on different processing elements of an architecture with no communication between the processing elements needed. There are several ways in which such All-to-All comparisons can be parallelized among different processing elements. One approach may be to use a queue in which all comparisons are queued up and processing elements can then take work out of the queue as needed when they run out of work to do. For example, the comparisons may be queued up as pairs of data elements to be compared, e.g., (S1, S2), (S1, S3), and (S2, S3), for example, with a first processing element taking the first comparison (S1, S2), a second processing element taking the second comparison (S1, S3), and a third processing element taking the third comparison (S2, S3) from the queue as these processing elements become free to perform more work. However, in a queue based approach to parallelizing an All-to-All comparison, shared memory processing elements will need to lock access to the queue to prevent other processing elements from accessing the queue at the same time in order to avoid data corruption.

Another approach to parallelizing the All-to-All comparison is to allocate the comparison directed to the same sequence or data element to the same processing element, but with each sequence or data element being assigned to a different processing element in a round robin fashion. For example, all the comparisons for sequence or data element S1 may be allocated to a first processing element, e.g., SPE 1, and thus, SPE 1 will do all comparisons of S1 with S2 and S3. Similarly, sequence or data element S2 may be allocated to a second processing element, e.g., SPE 2, which will do the comparison of S2 with S3, and so on. Such parallelization, while not optimal for load-balancing, since the first processing element will do more work than the second processing element, which in turn does more work than the third processing element, etc., still may yield fairly good results given a large amount of work to be distributed amongst a relatively small number of processing elements.

A hybrid approach may also be utilized. For example, a hybrid approach may be to divide the total number of comparisons among the processing elements and allocate the work in a round robin fashion. For example, given 4 data elements S1, S2, S3, and S4, six comparisons are to be performed (S1 with S2, S3, and S4), (S2 with S3 and S4), and (S3 and S4). All of these comparison can be queued up in a work queue in which processing elements, e.g., SPEs, access the work in the queue in a round robin fashion. For example, the work queue may be as follows:

1) (S1, S2)
2) (S1, S3)
3) (S1, S4)
4) (S2, S3)
5) (S2, S4)
6) (S3, S4)

Thus, if there are 3 processing elements, e.g., SPEs, SPE 1 may perform comparison 1) (S1, S2) and comparison 4) (S2, S3). SPE 2 may perform comparison 2) (S1, S3) and comparison 5) (S2, S4). SPE 3 may perform comparison 3) (S1, S4) and comparison 6) (S3, S4).

Each of these approaches however, also need to take into consideration the time to perform the comparison between any data elements. That is, it is not necessarily the case that the comparison operations will all take the same amount of time to perform. For example, in bioinformatic applications, where global or local alignment algorithms are dependent on the lengths of sequences which vary to a significant degree, the amount of time to perform various ones of these comparisons may be significantly different.

Moreover, all of the above approaches assume that the data elements and the output results can easily fit into the memory or storage space of the processing elements, e.g., the local memory or stores. However, in architectures where there is limited storage space, such as in the CBE 200 where there is limited storage space in the local memory or stores, additional challenges are posed for parallel comparison algorithm design due to this limited storage space.

The mechanisms of the illustrative embodiments address these issues with regard to performing parallel comparison operations for an All-to-All comparison by providing a mechanism that finds a substantially optimal parallel solution through a runtime comparison of work allocated to every processing element, e.g., SPEs or processing cores. Through such a runtime comparison, the mechanisms of the illustrative embodiments find a unique solution that maximizes reuse of the data streamed into the local store, divides work substantially optimally among the SPEs or the cores for a substantially optimal load-balanced approach, and minimizes the number of short messages between the local store and the main memory to maximize the chip or network bandwidth performance. Where parallel algorithms may be focused on dividing work among the processing elements either through a dynamic strategy, such as a queue-based approach, or a static load-balanced round robin approach, the mechanisms of the illustrative embodiments divide work in a substantially optimal manner, taking into consideration other aspects of the architecture, i.e. aspects other than only the amount of workload on each of the processing elements, which are equally important for performance.

Figure 4:
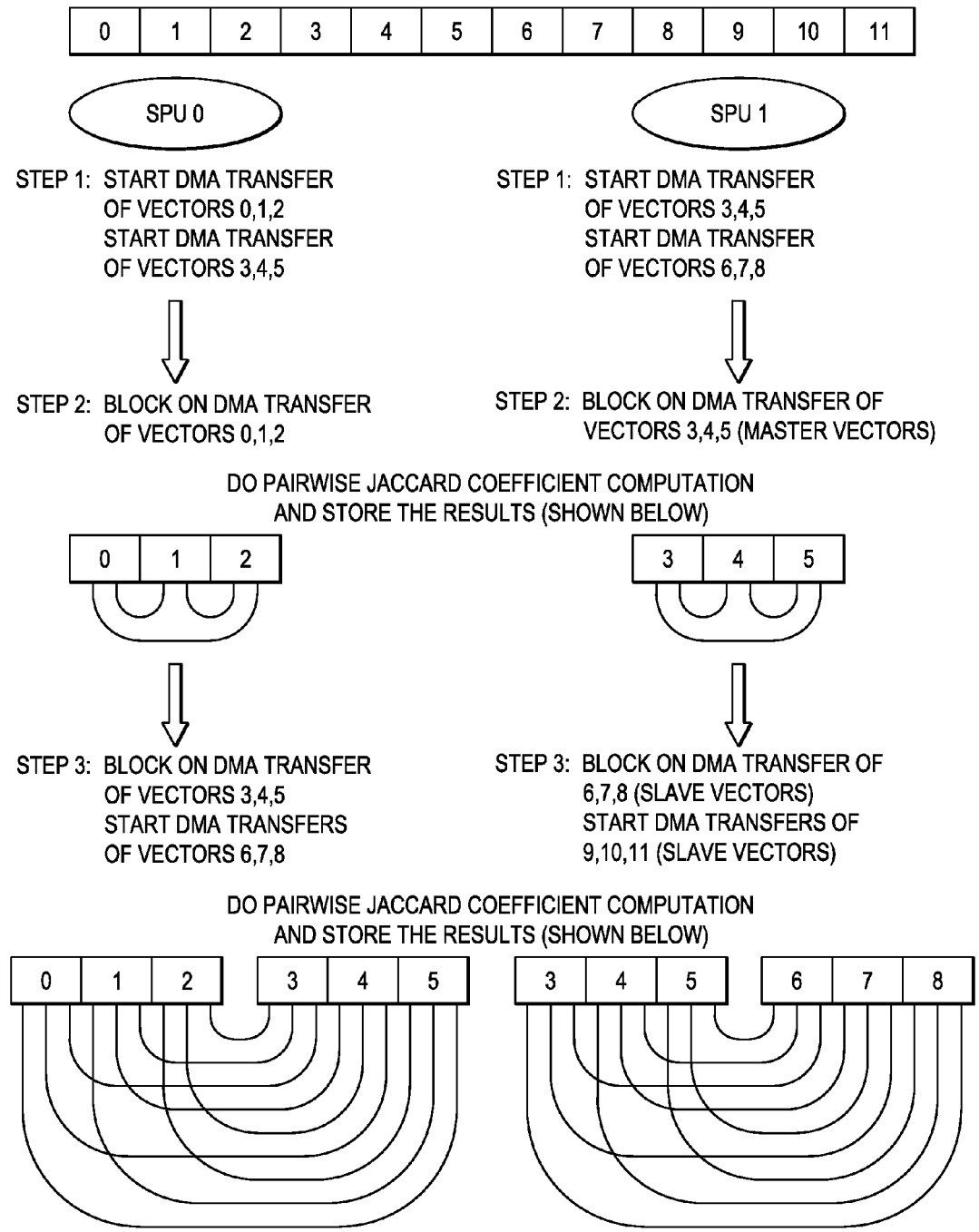
FIGS. 4-6 are example diagrams showing a stepwise operation for performing an operation for finding a substantially optimal parallel solution to performing an All-to-All comparison in accordance with one illustrative embodiment.
Figure 5:
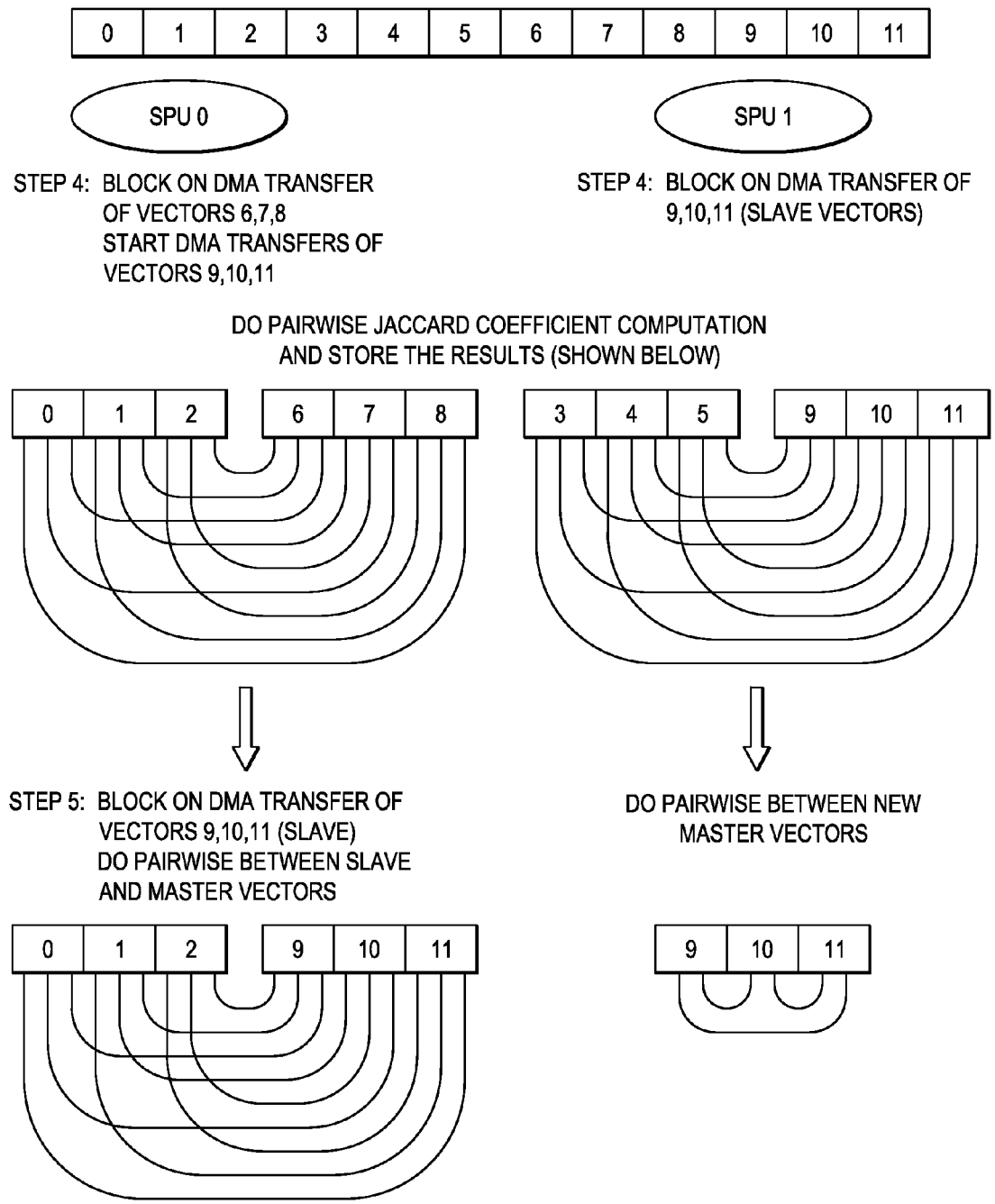
Figure 6:
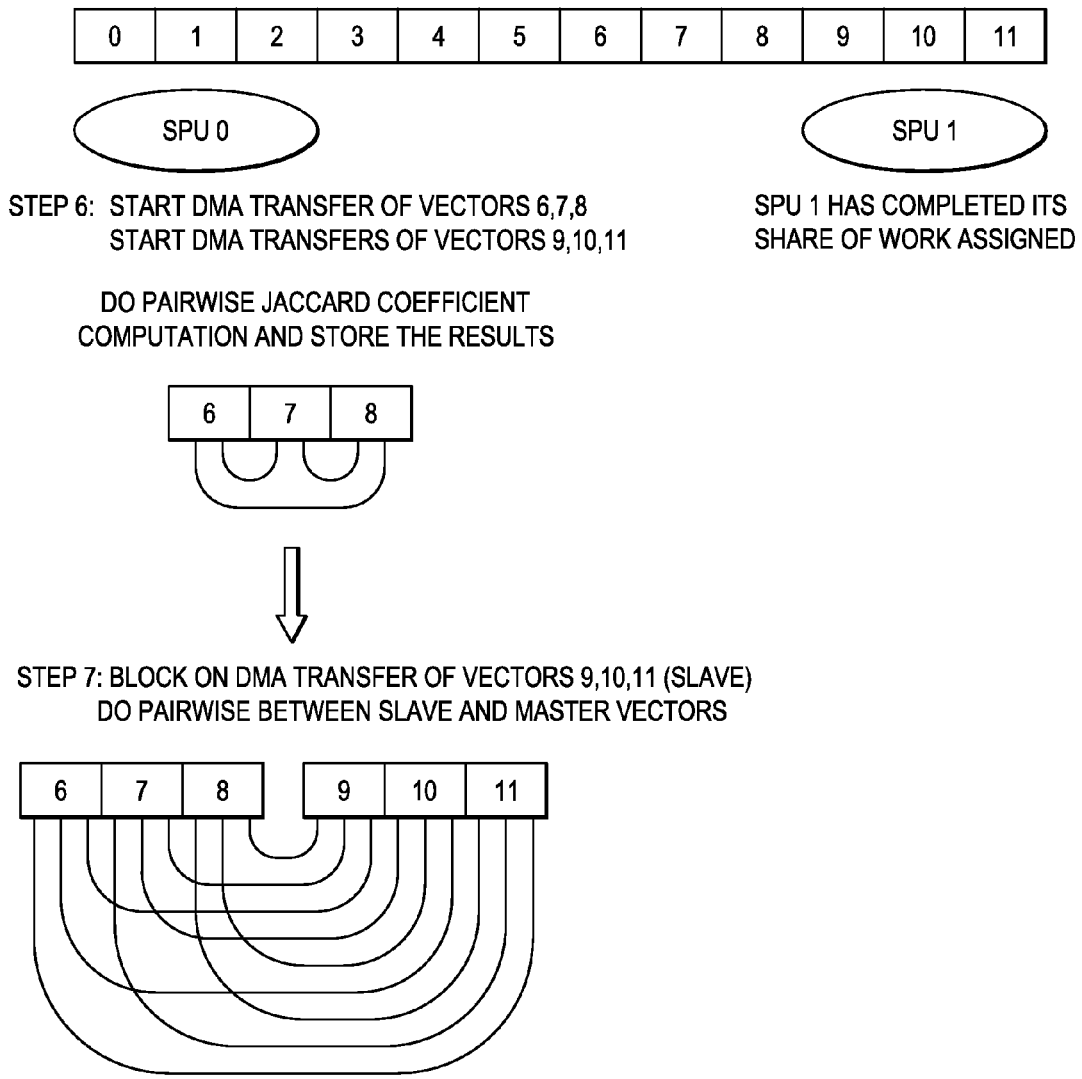

FIGS. 4-6 are example diagrams showing a stepwise operation for performing an operation for finding a substantially optimal parallel solution to performing an All-to-All comparison in accordance with one illustrative embodiment. In the example shown in FIGS. 4-6, the operation is performed for twelve data elements (numbered 0 to 11) and two processing elements, which in the depicted example are SPUs 0 and 1 of two separate SPEs in a CBE architecture. This is only an example and is not intended to state or imply any limitation on the illustrative embodiments with regard to the number of data elements to which the mechanisms of the illustrative embodiments may be applied, the number of processing elements to which the mechanisms of the illustrative embodiments may be applied, or the types of data elements and processing elements.

The operation outlined in FIGS. 4-6 works as follows. Given n vectors numbered 0 to n−1, the illustrative embodiment computes the Jaccard coefficients for each pair of vectors (i, j). In the depicted example, n=12 with each data element being a vector, and the number of SPEs is 2. The vectors are divided amongst the SPEs by allocating sets of vectors, where the set of vectors has a number of vectors (nvecs) determined at runtime, to each SPE in a round robin fashion. In the depicted example, nvecs=3. In a real world implementation, however, nvecs may be decided through a runtime test in which the value of nvecs is varied until the lowest time execution is found. For example, this runtime test may involve setting a value for nvecs, running the all-to-all comparison according to the illustrative embodiments described herein, and then keeping track of the amount of execution time required. This process may be repeated a number of times with the nvecs value for the best, i.e. smallest, execution time being selected for use with future all-to-all comparisons performed using the illustrative embodiments. A table or other data structure may be used to maintain the determined nvecs values for different data element types such that for subsequent all-to-all comparisons, based on the data element type that is the subject of the all-to-all comparison, a particular nvecs value may be selected from the table or data structure.

The nvecs value is dependent on several parameters, such as ratio of computation to the communication time for every pair of data elements, the total number of data elements, etc. For example, if n data elements are streamed in, there is a total cost of communication of $1+n*b$, where 1 is the latency to get the first element in and b is the bandwidth expressed in terms of one data element size. For these n elements there is $n*(n-1)/2$ computations to be performed with the computations taking $(n*(n-1))*t/2$ execution time, where t is the cost of computing on one pair of data and result vectors to be sent out. The ratio of computation to communication time is thus dependant on the algorithm used, its mapping to the hardware, and architectural parameters, such as latency and bandwidth. Thus, this parameter varies depending on the architecture, network, and algorithm used as well as the total number of data elements and the number of processing elements.

A lower nvecs value denotes increased number of messages, e.g., DMA transactions (requests/responses), since higher number of messages are needed to finish the data movement of all of the input elements. However, this also leads to a more optimal load-balancing. A higher nvecs value leads to a lower number of messages but a less optimal load balancing strategy.

In the depicted example, nvecs=3 leads to SPE 1 completing its work two steps, or cycles, ahead of SPE 0. This is because for each data element, comparison computations are performed for all indices greater than its own, i.e. for data element 0 Jaccard comparisons are performed with data elements 1-11, for data element 1 Jaccard comparisons are performed with data elements 2-11, and so on. In general, for data element I, n−i−1 Jaccard comparisons are performed. Since the data elements, or vectors in this example, are allocated in a round-robin fashion in strides of nvecs, a lower nvecs value leads to a more load-balanced strategy.

When the first set of vectors corresponding to the nvecs value, referred to herein as the master vectors, are DMA'd to the SPE local store from the main memory, the SPE computes the Jaccard coefficient within each pair of the first set of vectors. Before these computations among the set of master vectors is completed, another DMA request for the next set of vectors, referred to herein as the slave vectors, beginning from the index master vectors+1, is sent to main memory. In the depicted example, SPE 0 is shown starting two separate DMA transfers, a first DMA transfer of vectors 0, 1, and 2, and a second DMA transfer of vectors 3, 4, and 5. SPE 1 also starts two DMA transfers, a first DMA transfer of vectors 3, 4, and 5, and a second DMA transfer of vectors 6, 7, and 8. SPE 0 blocks on the DMA transfer of vectors 0, 1, and 2 to start its Jaccard coefficient computations while SPE 1 blocks on the DMA transfer having data elements 3, 4, and 5. What is meant by the SPE "blocking" on the DMA transfer is that the SPE will not proceed until the data requested through the DMA request has arrived. DMA requests can be blocking or non-blocking Non-blocking implies that after the request, the SPU continues its work and does not wait for data to arrive. Blocking means that the SPUs waits for the data to arrive before it performs its computation. The second DMA transfers for each SPE, e.g., the DMA of vectors 3, 4, and 5 for SPE 0 and the DMA of vectors 6, 7, and 8 for SPE 1), continue being processed during this blocking by the SPEs thus allowing Jaccard coefficient computation to continue for the present step of the operation while communication is being performed with main memory to obtain the next set of vectors for each SPE.

SPE 0 then completes its Jaccard coefficient computations, i.e. the comparisons among each pair of vectors, or data elements, 0, 1, and 2 (i.e. (0, 1), (0, 2), and (1, 2)), while SPE 1 completes its Jaccard coefficient computations among each pair of vectors, or data elements, 3, 4, and 5 (i.e. (3, 4), (3, 5), and (4, 5)). The result values, i.e. the Jaccard coefficients, for these computations are stored at appropriate places in the main memory. That is, the results are DMA'd to the main memory once the computations are finished for the principal data element. For example, in the above case computations with regard to data element 3 are performed with data elements 4 and 5. At this point result vectors for (3, 4) and (3, 5) are sent to the main memory in a non-blocking manner. Similarly, when the computation with regard to data element 4 and data element 5 is completed, the result vector of (4, 5) is sent to the main memory. The sending of the result of (4, 5) may be done in a blocking or non-blocking manner. Generally, the cost of sending out the result vectors is negligible since size of the results is small (integer or floating point value) compared to size of input vectors (DNA sequences, or NCI database compounds).

In general for the ith vector, n−i−1 computations are performed beginning from index (i+1) to (n−1). These values are stored beginning at the index ni−(i*(i+1))/2. The comparison results of (i,j) are stored at (n*i)−(i*(i+1))/2−i−1+j. There are two scenarios for storing the results: in the case of master vectors for each data element, or vector, i, (nvecs−I−1) result values need to be sent to main memory at the index described above; in the case of a comparison of a master vector with a slave vector, for each data element, or vector, i, (nvecs) comparisons are done and thus, (nvecs) result values are stored in main memory, again according to the index given above.

The Jaccard coefficient among the new set of vectors, i.e. the slave vectors, and the master vectors is then computed. In the depicted example, the data elements 3, 4, and 5 are slave vectors for the SPE 0 and the data elements 6, 7, and 8 are slave vectors for the SPE 1. SPE 0 performs computations on data elements 0, 1, and 2, which are already in the local store for SPE 0 from the previous DMA operation, and on data elements 3, 4, and 5. Thus, for example, data element 0 is compared against data elements 3, 4, and 5, and so is data element 1 and 2. For SPE 1, data elements 6, 7, and 8 are slave vectors. SPE 1 performs computations on data elements 3, 4, and 5 with data elements 6, 7, and 8. Thus, data element 3 is compared with data elements 6, 7, and 8, and so are data elements 4 and 5.

At each step of the operation, two distinct DMA request messages for each SPE are sent to the main memory requesting data. One DMA request message is sent for the current step and is blocked. The other DMA request message is for the next step and does not need to be blocked. Thus, for example, in step 3, a first DMA request is sent for data elements 3, 4, and 5 which are already present in the local store due to the DMA operations in step 1. Furthermore, in step 3, a second DMA request is sent for data elements 6, 7, and 8 which is not blocked. This approach overlaps computation with communication. That is, in step 3, when data transfer of data elements 3, 4, and 5 for SPE 0 is blocked, data transfer of data elements 5, 7, 8 for SPE 0 is also initiated. Sin a similar manner, for step 3 for SPE 1, when data transfer of data elements 6, 7, and 8 is blocked, data transfer of data elements 9, 10, and 11 is initiated.

This process of streaming in the sets of data elements or vectors is repeated until the entire set of n vectors is completed. Thus, SPE 0 in the next step blocks on data transfer of data elements 6, 7, and 8 and initiates transfers of data elements 9, 10, and 11. The process then completes the comparisons between the master vectors 0, 1, and 2, and the new set of slave vectors 6, 7, and 8. SPE 1 blocks on data transfer of data elements 9, 10, and 11 and then completes the comparisons between its set of master vectors 3, 4, and 5, and the new set of slave vectors 9, 10, and 11. For SPE 0, the set of slave vectors is not finished, it still needs to complete the comparisons with elements 9, 10, and 11. However, SPE 1 is finished with the set of slave vectors, the next set of master vectors 9, 10, and 11 is now transferred to SPE 1.

SPE 0 in the next step blocks on DMA transfers of data elements (vectors) 9, 10, and 11 and completes the comparisons of its master vectors (0, 1, and 2) with the last of the slave vectors (9, 10, and 11). SPE 1 blocks on the new set of master vectors (9, 10, and 11) and does pair wise computations among this set of master vectors (9 with 10 and 11, and 10 with 11). At this point, SPE 1 is done with its share of allocated work. SPE 1 is thus idle from this step onward. SPE 0 on the other hand, begins the next set of transfers, one with data elements 6, 7, and 8, and then does pairwise computations among these data elements (t with 7 and 8, and 7 with 8). In the next step, SPE 0 is blocked on the data transfer of data elements 9, 10, and 11 and then SPE 0 does comparison computations of the master vectors (6, 7, and 8) with salve vectors (9, 10, and 11). At this point all the computations are finished and the results have been sent back to main memory in the manner previously described.

Thus, the mechanisms of the illustrative embodiments find a substantially optimal parallel solution to the All-to-All Jaccard comparisons algorithm through a runtime comparison of work allocated to every processing element, e.g., processor core, SPE or the like. Through such a runtime comparison, the illustrative embodiments find the unique solution that maximizes reuse of the data streamed into the local store of the processing element. For example, the mechanisms of the illustrative embodiments perform all-to-all comparisons among every set of vectors that is streamed into the local store of the processing element, i.e. the master vectors (when they are streamed in), and then also between the master vectors and the slave vectors. This leads to maximal reuse of the data.

In addition, the illustrative embodiments overlap computation with communication to thereby "hide" the latency of the data. For example, data is DMA'd from main memory such that it arrives when comparisons among other data are being performed, e.g., when comparisons among master vectors are being performed, the slave vectors are being DMA'd into the local store of the processing element. When one set of slave vector computations has started, the next set of slave vectors are already being streamed into the local store. This overlaps computation with communication, thus enabling lower execution time.

Moreover, the illustrative embodiments divide work substantially optimally among the processing elements, e.g., SPEs, processor cores, or the like, for a substantially optimal load-balanced approach. Lower nvecs values lead to more balanced work among the SPEs, while increasing the number of messages, e.g., DMA requests/responses, needed as mentioned above. Higher nvecs values lead to lower messages but more work inequality. Thus there are competing interests which are balanced by the runtime tests of the illustrative embodiments which select an nvecs value that is optimum based on these considerations.

Furthermore, the illustrative embodiments minimize the number of short messages between the local store and the main memory, thereby maximizing the chip and/or the network bandwidth performance. As mentioned above, most parallel algorithms have focused on dividing work among the processing elements either through a dynamic strategy such as a queue-based approach or a static load-balanced round-robin approach. The illustrative embodiments divide work substantially optimally, taking into consideration other aspects of the architecture which are equally important for performance. Results of implementation of the illustrative embodiments show that a super-linear speedup is achieved for a small number of input vectors, by optimizing several characteristics as shown above. This achieved, in part, because the number of messages passed back and forth between the local stores and the main memory are rendered irrelevant as long as the latency associated with these messages are "hidden" by computations being performed by the processing elements. In other words, as long as the processing elements are computing on one set of data, the latency associated with requesting data at the same time as the computations are being performed is rendered irrelevant, i.e. the latency of the computation is the only cost required. By varying the nvecs value, the illustrative embodiments can basically choose the most substantially optimal setting to balance all the competing interests: load-balancing among the processing elements, minimizing the number of messages, and overlapping computation with communication.

Figure 7:
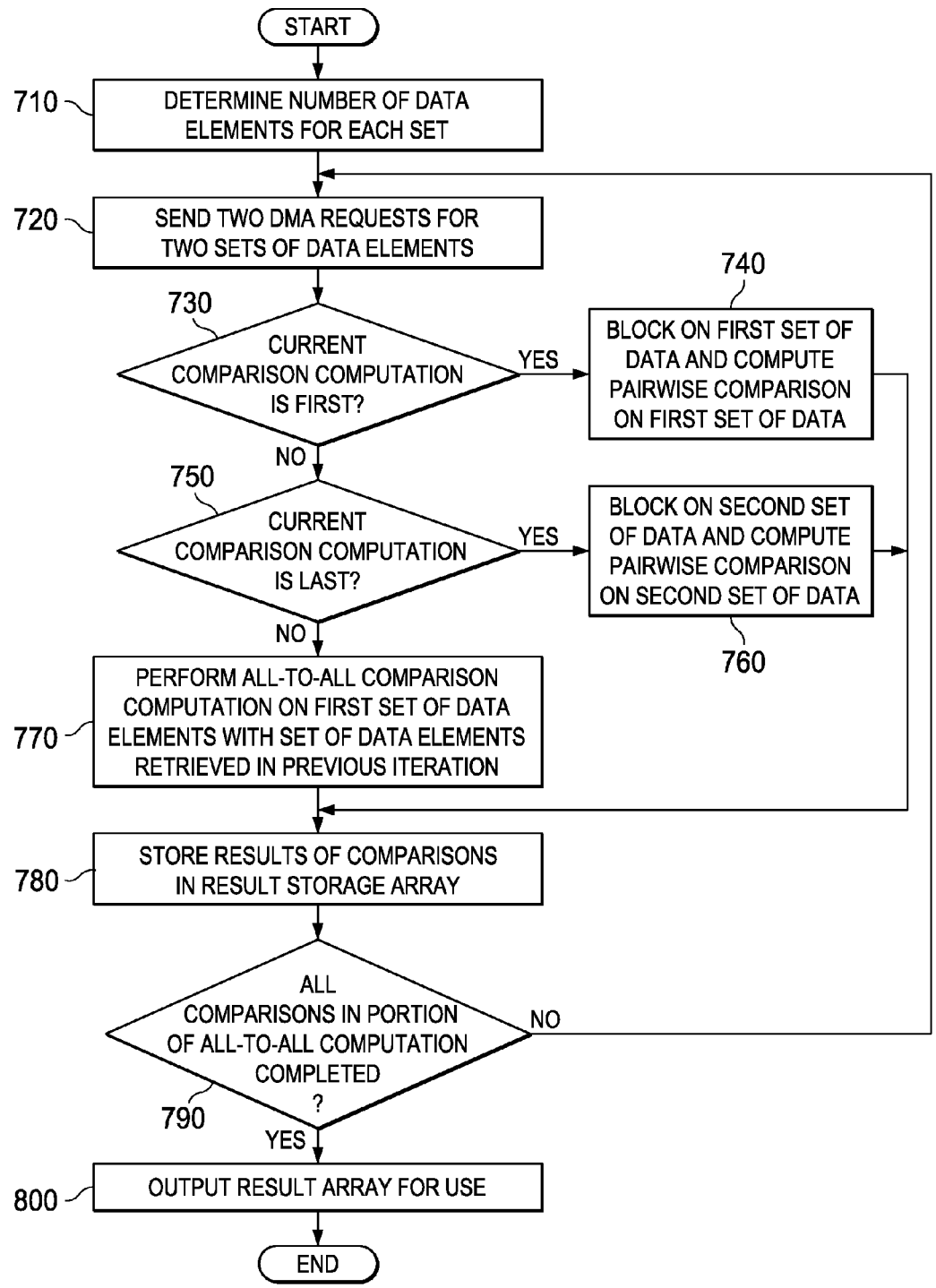
FIG. 7 is a flowchart outlining an example operation for performing an All-to-All comparison computation in accordance with one illustrative embodiment.

FIG. 7 is a flowchart outlining an example operation for performing an All-to-All comparison operation in accordance with one illustrative embodiment. The operation shown in FIG. 7 may be implemented in software, hardware, or any combination of software and hardware. In one illustrative embodiment, the operation is performed by software executed by one or more processors, e.g., PPE 210 or one or more of SPEs 220-234 of a data processing system, e.g., CBE 200. However, it should be appreciated that one or more dedicated hardware devices may be provided for performing all of the operations, or sub-combinations of the individual operations, outlined within FIG. 7 without departing from the spirit and scope of the illustrative embodiments. For example, a special purpose All-to-All comparison engine may be provided within the data processing system having logic for implementing the mechanisms of the illustrative embodiments. Other embodiments utilizing software, hardware, or a combination of software and hardware that may become apparent to those of ordinary skill in the art in view of the present description are intended to be within the spirit and scope of this description of the illustrative embodiments.

As shown in FIG. 7, the operation starts by determining a number of data elements, e.g., a nvec value, for the sets of data elements to be sent to each processing element (step 710). Then, for each processing element, steps 720-790 are performed. In step 720, the processing element sends two DMA request, one for a first set of data elements and another for a second set of data elements. A determination is made as to whether the current comparison computation is a first comparison computation being performed by the processing element (step 730). If so, then a pair wise comparison of the data elements in the first set of data elements is performed (step 740). If it is not a first comparison computation, a determination is made as to whether the current comparison computation is a last comparison computation (step 750). If so, then a pair wise comparison of the data elements in the second set of data elements is performed (step 760).

If the current comparison computation is neither a first or last comparison computation, then an all-to-all comparison computation is performed on the first set of data elements with a previously retrieved set of data elements, e.g., the second set of data elements from a previous iteration, stored in a local store of the processing element (step 770). The result of the comparison computation is stored in a result storage array (step 780) and a determination is made as to whether the portion of the all-to-all computation allocated to the processing element has been completed (step 790). This may involve, for example, determining if the last set of data elements has been retrieved into the local store of the processing element and has been the subject of the last pair wise comparison computation. If the portion of the all-to-all computation allocated to the processing element has been completed, then the result array is output for use in performing an operation based on the similarity of data elements and the operation terminates (step 800). If the portion of the all-to-all computation allocated to the processing element has not been completed, then the operation returns to step 720.

Thus, the illustrative embodiments provide mechanisms for performing all-to-all comparison computations with minimal DMA transfers, overlapping computation and communication, reuse of data in local stores of processing elements, and runtime determined load-balancing among processing elements. The mechanisms of the illustrative embodiments provide super linear speedup as the number of SPEs or processing elements are increased.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system having a plurality of processing elements, for performing a portion of an All-to-All comparison of data elements operation, comprising:
    determining a number of data elements to be included in each set of data elements to be sent to each processing element of the plurality of processing elements when executing their respective portions of the All-to-All comparison of data elements operation, wherein each set of data elements has a same number of data elements;
    performing a comparison operation, of a portion of the All-to-All comparison of data elements operation assigned to a processing element, on at least one set of data elements, wherein the comparison operation comprises:
        sending, from the processing element, a first request to main memory for transfer of a first set of data elements into a local memory associated with the processing element, the first request being sent in a blocking mode of operation and the first set of data elements being used to perform a current pair wise comparison of the portion of the All-to-All comparison of data elements operation;
        sending, from the processing element, a second request to main memory for transfer of a second set of data elements into the local memory, the second request being sent in a non-blocking mode of operation and the second set of data elements being used to perform a next pair wise comparison of the portion of the All-to-All comparison of data elements; and
        performing, by the processing element, a pair wise comparison computation of the portion of the All-to-All comparison of data elements operation using the first set of data elements transferred to the local memory associated with the processing element, at approximately a same time as the second set of data elements is being transferred from main memory to the local memory associated with the processing element; and
    storing results of the comparison operation in main memory of the data processing system.

2. The method of claim 1, wherein the number of data elements to be included in each set of data elements is determined by a runtime test that determines, across a plurality of iterations of the All-to-All comparison of data elements, a number of data elements that has a smallest execution time of the All-to-All comparison of data elements operation.

3. The method of claim 1, wherein the number of data elements to be included in each set of data elements is determined by a runtime test that selects a number of data elements that balances the interests of load-balancing among the processing elements in the plurality of processing elements, minimizing a number of messages exchanged between the processing elements and main memory, and overlapping computation performed by the processing elements with communication between the processing elements and main memory.

4. The method of claim 1, wherein, in response to the pair wise comparison computation being a first pair wise comparison computation of the portion of the All-to-All comparison of data elements operation, performing the pair wise comparison computation comprises comparing each data element in the first set of data elements with each other data element in the first set of data elements.

5. The method of claim 1, wherein, in response to the pair wise comparison computation being a last pair wise comparison computation of the portion of the All-to-All comparison of data elements operation, performing the pair wise comparison computation comprises comparing each data element in the second set of data elements with each other data element in the second set of data elements.

6. The method of claim 1, wherein, in response to the pair wise comparison computation not being a first pair wise comparison and not being a last pair wise comparison of the portion of the All-to-All comparison of data elements operation, performing the pair wise comparison computation comprises comparing each data element in the first set of data elements with each data element in a third set of data elements, the third set of data elements having been already retrieved into the local memory associated with the processing element as the second set of data elements of a previous comparison operation performed by the processing element.

7. The method of claim 1, wherein performing the pair wise comparison computation comprises computing a Jaccard coefficient for pairs of data elements.

8. The method of claim 1, wherein storing results of the comparison operation comprises storing the results of a comparison of a first data element with a second data element at a location indexed by the value $(n*i)-(i*(i+1))/2-i-1+j$, where i is the index of the first data element, j is the index of the second element, and n is the number of data elements to be included in each set of data elements to be sent to each processing element of the plurality of processing elements.

9. The method of claim 1, wherein the data processing system is a heterogeneous multiprocessor system comprising at least one control processor and at least one controlled processor, wherein the at least one control processor and the at least one controlled processor have different instruction sets.

10. The method of claim 9, wherein the processing elements in the plurality of processing elements are controlled processors.

11. A computer program product comprising a non-transitory computer recordable medium having a computer readable program recorded thereon, wherein the computer readable program, when executed on a computing device having a plurality of processing elements, causes the computing device to:
    determine a number of data elements to be included in each set of data elements to be sent to each processing element of the plurality of processing elements when executing their respective portions of an All-to-All comparison of data elements operation, wherein each set of data elements has a same number of data elements;
    perform a comparison operation, of a portion of an All-to-All comparison of data elements operation assigned to a processing element, on at least one set of data elements, wherein the comparison operation comprises:

sending, from the processing element, a first request to main memory for transfer of a first set of data elements into a local memory associated with the processing element, the first request being sent in a blocking mode of operation and the first set of data elements being used to perform a current pair wise comparison of the portion of the All-to-All comparison of data elements operation;

sending, from the processing element, a second request to main memory for transfer of a second set of data elements into the local memory, the second request being sent in a non-blocking mode of operation and the second set of data elements being used to perform a next pair wise comparison of the portion of the All-to-All comparison of data elements; and performing, by the processing element, a pair wise comparison computation of the portion of the All-to-All comparison of data elements operation using the first set of data elements transferred to the local memory associated with the processing element, at approximately a same time as the second set of data elements is being transferred from main memory to the local memory associated with the processing element; and store results of the comparison operation in main memory of the computing device.

12. The computer program product of claim 11, wherein the number of data elements to be included in each set of data elements is determined by a runtime test that determines, across a plurality of iterations of the All-to-All comparison of data elements, a number of data elements that has a smallest execution time of the All-to-All comparison of data elements operation.

13. The computer program product of claim 11, wherein the number of data elements to be included in each set of data elements is determined by a runtime test that selects a number of data elements that balances the interests of load-balancing among the processing elements in the plurality of processing elements, minimizing a number of messages exchanged between the processing elements and main memory, and overlapping computation performed by the processing elements with communication between the processing elements and main memory.

14. The computer program product of claim 11, wherein, in response to the pair wise comparison computation being a first pair wise comparison computation of the portion of the All-to-All comparison of data elements operation, performing the pair wise comparison computation comprises comparing each data element in the first set of data elements with each other data element in the first set of data elements.

15. The computer program product of claim 11, wherein, in response to the pair wise comparison computation being a last pair wise comparison computation of the portion of the All-to-All comparison of data elements operation, performing the pair wise comparison computation comprises comparing each data element in the second set of data elements with each other data element in the second set of data elements.

16. The computer program product of claim 11, wherein, in response to the pair wise comparison computation not being a first pair wise comparison and not being a last pair wise comparison of the portion of the All-to-All comparison of data elements operation, performing the pair wise comparison computation comprises comparing each data element in the first set of data elements with each data element in a third set of data elements, the third set of data elements having been already retrieved into the local memory associated with the processing element as the second set of data elements of a previous comparison operation performed by the processing element.

17. The computer program product of claim 11, wherein performing the pair wise comparison computation comprises computing a Jaccard coefficient for pairs of data elements.

18. The computer program product of claim 11, wherein the computing device stores results of the comparison operation by storing the results of a comparison of a first data element with a second data element at a location indexed by the value $(n*i)-(i*(i+1))/2-i-1+j$, where i is the index of the first data element, j is the index of the second element, and n is the number of data elements to be included in each set of data elements to be sent to each processing element of the plurality of processing elements.

19. An apparatus, comprising:
a control processor;
a plurality of controlled processors coupled to the control processor;
a plurality of local memories, each local memory being associated with a controlled processor of the plurality of controlled processors; and
a main memory coupled to the plurality of controlled processors, wherein the control processor determines a number of data elements to be included in each set of data elements to be sent to each controlled processor of the plurality of controlled processors when executing their respective portions of an All-to-All comparison of data elements operation, wherein each set of data elements has a same number of data elements, and wherein a processor in the plurality of processors;

perform a comparison operation, of a portion of an All-to-All comparison of data elements operation assigned to a controlled processor, on at least one set of data elements, wherein the comparison operation comprises:

sending, from the controlled processor, a first request to main memory for transfer of a first set of data elements into a local memory associated with the controlled processor, the first request being sent in a blocking mode of operation and the first set of data elements being used to perform a current pair wise comparison of the portion of the All-to-All comparison of data elements operation;

sending, from the controlled processor, a second request to main memory for transfer of a second set of data elements into the local memory, the second request being sent in a non-blocking mode of operation and the second set of data elements being used to perform a next pair wise comparison of the portion of the All-to-All comparison of data elements; and performing, by the controlled processor, a pair wise comparison computation of the portion of the All-to-All comparison of data elements operation using the first set of data elements transferred to the local memory associated with the processing element, at approximately a same time as the second set of data elements is being transferred from main memory to the local memory associated with the processing element; and store results of the comparison operation in main memory of the apparatus.

20. The apparatus of claim 19, wherein:
in response to the pair wise comparison computation being a first pair wise comparison computation of the portion of the All-to-All comparison of data elements operation, performing the pair wise comparison computation comprises comparing each data element in the first set of data elements with each other data element in the first set of data elements, in response to the pair wise comparison computation being a last pair wise comparison computation of the portion of the All-to-All comparison of data elements operation, performing the pair wise comparison computation comprises comparing each data element in the second set of data elements with each other data element in the second set of data elements, and in response to the pair wise comparison computation not being a first pair wise comparison and not being a last pair wise comparison of the portion of the All-to-All comparison of data elements operation, performing the pair wise comparison computation comprises comparing each data element in the first set of data elements with each data element in a third set of data elements, the third set of data elements having been already retrieved into the local memory associated with the controlled processor as the second set of data elements of a previous comparison operation performed by the controlled processor.

21. A computer program product comprising a non-transitory computer readable medium having a computer readable program stored thereon, wherein the computer readable program, when executed on a computing device having a plurality of processing elements, causes the computing device to:

determine a number of data elements to be included in each set of data elements to be sent to each processing element of the plurality of processing elements when executing their respective portions of an All-to-All comparison of data elements operation, wherein each set of data elements has a same number of data elements;

perform a comparison operation, of a portion of the All-to-All comparison of data elements operation assigned to a processing element, on at least one set of data elements, wherein the comparison operation comprises:

sending, from the processing element, a first request to main memory for transfer of a first set of data elements into a local memory associated with the processing element, the first request being sent in a blocking mode of operation and the first set of data elements being used to perform a current pair wise comparison of the portion of the All-to-All comparison of data elements operation;

sending, from the processing element, a second request to main memory for transfer of a second set of data elements into the local memory, the second request being sent in a non-blocking mode of operation and the second set of data elements being used to perform a next pair wise comparison of the portion of the All-to-All comparison of data elements; and performing, by the processing element, a pair wise comparison computation of the portion of the All-to-All comparison of data elements operation using the first set of data elements transferred to the local memory associated with the processing element, at approximately a same time as the second set of data elements is being transferred from main memory to the local memory associated with the processing element; and store results of the comparison operation in main memory of the computing device, wherein determining the number of data elements to be included in each set of data elements to be sent to each processing element of the plurality of processing elements comprises:

retrieving the number of data elements from a data structure based on a data element type of the data elements, wherein the data structure comprises a plurality of entries and each entry in the plurality of entries stores a number of data elements value in association with a corresponding data element type.

22. The computer program product of claim 21, wherein the number of data elements to be included in each set of data elements is determined by a runtime test that determines, across a plurality of iterations of the All-to-All comparison of data elements, a number of data elements that has a smallest execution time of the All-to-All comparison of data elements operation.

23. The computer program product of claim 21, wherein the number of data elements to be included in each set of data elements is determined by a runtime test that selects a number of data elements that balances the interests of load-balancing among the processing elements in the plurality of processing elements, minimizing a number of messages exchanged between the processing elements and main memory, and overlapping computation performed by the processing elements with communication between the processing elements and main memory.

24. The computer program product of claim 21, wherein, in response to the pair wise comparison computation being a first pair wise comparison computation of the portion of the All-to-All comparison of data elements operation, performing the pair wise comparison computation comprises comparing each data element in the first set of data elements with each other data element in the first set of data elements.

25. The computer program product of claim 21, wherein, in response to the pair wise comparison computation being a last pair wise comparison computation of the portion of the All-to-All comparison of data elements operation, performing the pair wise comparison computation comprises comparing each data element in the second set of data elements with each other data element in the second set of data elements.

26. The computer program product of claim 21, wherein, in response to the pair wise comparison computation not being a first pair wise comparison and not being a last pair wise comparison of the portion of the All-to-All comparison of data elements operation, performing the pair wise comparison computation comprises comparing each data element in the first set of data elements with each data element in a third set of data elements, the third set of data elements having been already retrieved into the local memory associated with the processing element as the second set of data elements of a previous comparison operation performed by the processing element.

27. The computer program product of claim 21, wherein performing the pair wise comparison computation comprises computing a Jaccard coefficient for pairs of data elements.

28. The computer program product of claim 21, wherein the computing device stores results of the comparison operation by storing the results of a comparison of a first data element with a second data element at a location indexed by the value $(n*i)-(i*(i+1))/2-i-1+j$, where i is the index of the first data element, j is the index of the second element, and n is the number of data elements to be included in each set of data elements to be sent to each processing element of the plurality of processing elements.

29. An apparatus, comprising:

a control processor;

a plurality of controlled processors coupled to the control processor;

a plurality of local memories, each local memory being associated with a controlled processor of the plurality of controlled processors; and a main memory coupled to the plurality of controlled processors, wherein the control processor determines a number of data elements to be included in each set of data elements to be sent to each controlled processor of the plurality of controlled processors when executing their respective portions of an All-to-All comparison of data elements operation, wherein each set of data elements has a same number of data elements, and wherein a processor in the plurality of processors;

perform a comparison operation, of a portion of an All-to-All comparison of data elements operation assigned to a controlled processor, on at least one set of data elements, wherein the comparison operation comprises:

sending, from the controlled processor, a first request to main memory for transfer of a first set of data elements into a local memory associated with the controlled processor, the first request being sent in a blocking mode of operation and the first set of data elements being used to perform a current pair wise comparison of the portion of the All-to-All comparison of data elements operation;

sending, from the controlled processor, a second request to main memory for transfer of a second set of data elements into the local memory, the second request being sent in a non-blocking mode of operation and the second set of data elements being used to perform a next pair wise comparison of the portion of the All-to-All comparison of data elements; and performing, by the controlled processor, a pair wise comparison computation of the portion of the All-to-All comparison of data elements operation using the first set of data elements transferred to the local memory associated with the controlled processor, at approximately a same time as the second set of data elements is being transferred from main memory to the local memory associated with the controlled processor; and store results of the comparison operation in main memory of the apparatus, wherein the control processor determines the number of data elements to be included in each set of data elements to be sent to each processing element of the plurality of processing elements comprises:

retrieving the number of data elements from a data structure based on a data element type of the data elements, wherein the data structure comprises a plurality of entries and each entry in the plurality of entries stores a number of data elements value in association with a corresponding data element type.

30. The apparatus of claim 29, wherein:

in response to the pair wise comparison computation being a first pair wise comparison computation of the portion of the All-to-All comparison of data elements operation, performing the pair wise comparison computation comprises comparing each data element in the first set of data elements with each other data element in the first set of data elements, in response to the pair wise comparison computation being a last pair wise comparison computation of the portion of the All-to-All comparison of data elements operation, performing the pair wise comparison computation comprises comparing each data element in the second set of data elements with each other data element in the second set of data elements, and in response to the pair wise comparison computation not being a first pair wise comparison and not being a last pair wise comparison of the portion of the All-to-All comparison of data elements operation, performing the pair wise comparison computation comprises comparing each data element in the first set of data elements with each data element in a third set of data elements, the third set of data elements having been already retrieved into the local memory associated with the processing element as the second set of data elements of a previous comparison operation performed by the processing element.

31. The apparatus of claim 29, wherein the number of data elements to be included in each set of data elements is determined by a runtime test, executed by at least one of the control processor or a controlled processor in the plurality of controlled processors, that determines, across a plurality of iterations of the All-to-All comparison of data elements, a number of data elements that has a smallest execution time of the All-to-All comparison of data elements operation.

32. The apparatus of claim 29, wherein the number of data elements to be included in each set of data elements is determined by a runtime test, executed by at least one of the control processor or a controlled processor in the plurality of controlled processors, that selects a number of data elements that balances the interests of load-balancing among the processing elements in the plurality of processing elements, minimizing a number of messages exchanged between the processing elements and main memory, and overlapping computation performed by the processing elements with communication between the processing elements and main memory.

33. The apparatus of claim 29, wherein, in response to the pair wise comparison computation being a first pair wise comparison computation of the portion of the All-to-All comparison of data elements operation, performing the pair wise comparison computation comprises comparing each data element in the first set of data elements with each other data element in the first set of data elements.

34. The apparatus of claim 29, wherein, in response to the pair wise comparison computation being a last pair wise comparison computation of the portion of the All-to-All comparison of data elements operation, performing the pair wise comparison computation comprises comparing each data element in the second set of data elements with each other data element in the second set of data elements.

35. The apparatus of claim 29, wherein, in response to the pair wise comparison computation not being a first pair wise comparison and not being a last pair wise comparison of the portion of the All-to-All comparison of data elements operation, performing the pair wise comparison computation comprises comparing each data element in the first set of data elements with each data element in a third set of data elements, the third set of data elements having been already retrieved into the local memory associated with the processing element as the second set of data elements of a previous comparison operation performed by the processing element.

36. The apparatus of claim 29, wherein performing the pair wise comparison computation comprises computing a Jaccard coefficient for pairs of data elements.

37. The apparatus of claim 29, wherein the apparatus stores results of the comparison operation by storing the results of a comparison of a first data element with a second data element at a location indexed by the value $(n*i)-(i*(i+1))/2-i-1+j$, where i is the index of the first data element, j is the index of the second element, and n is the number of data elements to be included in each set of data elements to be sent to each processing element of the plurality of processing elements.

38. The computer program product of claim 21, wherein determining the number of data elements to be included in each set of data elements to be sent to each processing element of the plurality of processing elements comprises:
  setting the number of data elements based on function of a total number of data elements and a ratio of computation time to communication time for processing pairs of data elements in the total number of data elements.

39. The computer program product of claim 21, wherein performing the pair wise comparison computation of the portion of the All-to-All comparison of data elements operation comprises:
  determining if the pair wise comparison computation is a first pair wise comparison computation of the portion of the All-to-All comparison, a last pair wise comparison computation of the portion of the All-to-All comparison, or neither a first pair wise comparison computation nor last pair wise comparison computation of the portion of the All-to-All comparison; and
  executing the pair wise comparison in a different manner depending upon whether the pair wise comparison computation is determined to be a first pair wise comparison computation, last pair wise comparison computation, or neither a first nor last pair wise comparison computation of the portion of the All-to-All comparison.

* * * * *